United States Patent [19]
Oishi

[11] Patent Number: 4,742,420
[45] Date of Patent: May 3, 1988

[54] MAGNETIC DISK WITH A POROUS SUBSTRATE

[75] Inventor: Kengo Oishi, Kanagawa, Japan

[73] Assignee: Fuji Photo Film Co., Ltd., Kanagawa, Japan

[21] Appl. No.: 889,717

[22] Filed: Jul. 28, 1986

[30] Foreign Application Priority Data

Aug. 21, 1985 [JP] Japan .................. 60-126501[U]

[51] Int. Cl.$^4$ .................................................. G11B 5/82
[52] U.S. Cl. ........................................ 360/135; 428/65
[58] Field of Search .................. 360/135, 97–99; 346/137; 428/65; 369/287–288, 280

[56] References Cited

U.S. PATENT DOCUMENTS 3,737,880  6/1973  Kelley .............................. 360/105 X
4,376,963  3/1983  Knoop et al. ...................... 360/135
4,623,570  11/1986  Alexander et al. ............. 360/135 X

*Primary Examiner*—John H. Wolff
*Attorney, Agent, or Firm*—Sughrue, Mion, Zinn, Macpeak & Seas

[57] ABSTRACT

A magnetic recording disk having a rigid substrate disc is provided with an annular air gap defined between inner and outer peripheral bonding rings. A flexible disc sheet having a recording surface is placed over the arrangement and held tight against the peripheral bonding rings while the inner and outer edges of the flexible disc sheet are bonded to the bonding rings. In order to avoid deformation of the recording surface due to thermal expansion of the air trapped in the gap, the substrate is made porous to provide air passages between the air gap and the external atmosphere.

9 Claims, 1 Drawing Sheet

MAGNETIC DISK WITH A POROUS SUBSTRATE

BACKGROUND OF THE INVENTION

1. Field of the Invention

This invention relates to a magnetic disk for magnetic recording in a direction parallel to or perpendicular to the surface thereof.

2. Background Art

One example of a conventional magnetic disk is a rigid magnetic disk. The substrate of the rigid magnetic disk is made of rigid material. In general, the rigid magnetic disk employs an aluminum substrate (JIS A5086 for instance).

The rigid magnetic disk is generally formed as follows. An aluminum plate is machined on a lathe, and its surface is polished so that a data recording operation is performed at high density with the space minimized between the disk and the head. Thereafter, a magnetic layer is formed thereon by vacuum deposition or spin coating. For high density recording and reproducing, the surface of the disk should be smooth. However, it has been difficult for the conventional magnetic disk having the aluminum substrate to provide a surface of not more than 0.1 micrometers in central line average roughness Ra. Furthermore, since the substrate is rigid, informing the magnetic layer, the continuous coating is limited by the web pass. That is, handling of the conventional rigid substrate is rather troublesome. On the other hand, a high density recording operation is greatly affected by the dust on the disk. Therefore, it is essential to manufacture magnetic disks in a dust-proof environment Accordingly, the magnetic disk manufacturing process is considerably intricate, thus requiring an enormous sum for investment in equipment.

The conventional substrate, such as an aluminum substrate, is rigid. Also, the head should not contact the magnetic layer in tracing the magnetic layer. However, it is difficult to maintain constant the narrow space between the head and the magnetic layer, and therefore signal errors occur frequently. And it is considerably difficult to further reduce the space between the head and the disk surface to thereby increase the recording density. If the magnetic head is accidentally brought into contact with the disk during the tracing operation with the narrow space maintained, a sliding frictional force is produced because the substrate is rigid. As a result, a great impact is applied collectively to the part of the magnetic layer which has contacted the head, which can break the disk surface, thus reducing the service life of the disk.

Furthermore, the aluminum substrate polished as described above is expensive.

On the other hand, a magnetic disk as shown in FIG. 1 has been proposed in the art. In the magnetic disk, a wide annular recess or groove 3 is formed on each side of a disk substrate 1. Floppy disks or flexible disks (hereinafter referred to as "flexible disk sheets") have a magnetic layer 5 on one side of a support 4. The support 4 with the attached magnetic layer 5 is bonded to an inner annular bonding ridge 6a and an outer annular bonding ridge 6b. An air gap is thus formed in the recess or groove 3 beneath the support 4. The magnetic layers 5 are exposed on the outside. Data is recorded on portions of the magnetic layers 5 over the grooves 3.

Heretofore, the substrate is made of metal such as aluminum or aluminum alloy, glass or polymer which were selected because they cause minimal thermal deformation.

Examples of the polymer are polycarbonate, polyphenylene sulfide, polysulfide, polyimide, polysulfone, polyacrylate, polyether sulfone, polyether imide and polyether ether ketone.

The magnetic recording surfaces of the conventional magnetic disk thus constructed are flexible. Therefore, even when the magnetic head is accidentally brought into contact with the magnetic recording surface, or when a higher density recording operation is carried out with the magnetic head held in contact with the magnetic recording layer, the magnetic layer is scarcely broken, unlike that of the rigid disk. Accordingly, the technique of flexible disks can be utilized as it is. Furthermore, a smooth magnetic layer which is high in durability can be used as a magnetic disk's magnetic layer. Thus, the magnetic disk is being watched with keen interest, eliminating the difficulties accompanying a conventional rigid magnetic disk.

The inventors have conducted intensive research on the magnetic disk of this type, and found that it still suffers form serious difficulties. That is, the air is the gaps is sealed when the flexible disk sheets are bonded to the substrate. Therefore, as the ambient temperature changes or the magnetic disk is continuously used the air in the gaps changes in volume (expanding or contracting), thus affecting the effective conditions of the magnetic head output. In other words, the effective tensile force of the flexible disk sheets is changed by the expansion or contraction of the air. As a result, the thickness of the air layer flowing through the space between the magnetic head and the flexible disk sheet is changed. That is, the spacing loss of the magnetic head is changed, thus affecting the magnetic head output.

SUMMARY OF THE INVENTION

Accordingly, an object of invention is to eliminate the above-described difficulties accompanying a conventional magnetic disk.

More specifically, an object of the invention is to provide a magnetic disk with which the head spacing loss can be maintained unchanged irrespective of the temperature.

The invention can be summarized as a magnetic disk in which wide annular grooves are formed on both sides of a substrate and flexible disk sheets are bonded on the inner and outer peripheral ridges which define the grooves. According to the invention, the substrate is porous.

Fine holes may be formed in the substrate in such a manner that the grooves have passages through the peripheral wall of the substrate. The same effect can be obtained by forming the substrate with a porous material of acrylonitrile styrene-butadiene (ABS) or polystyrene (PS).

DETAILED DESCRIPTION OF THE PREFERRED EMBODIMENTS

Figure 2:
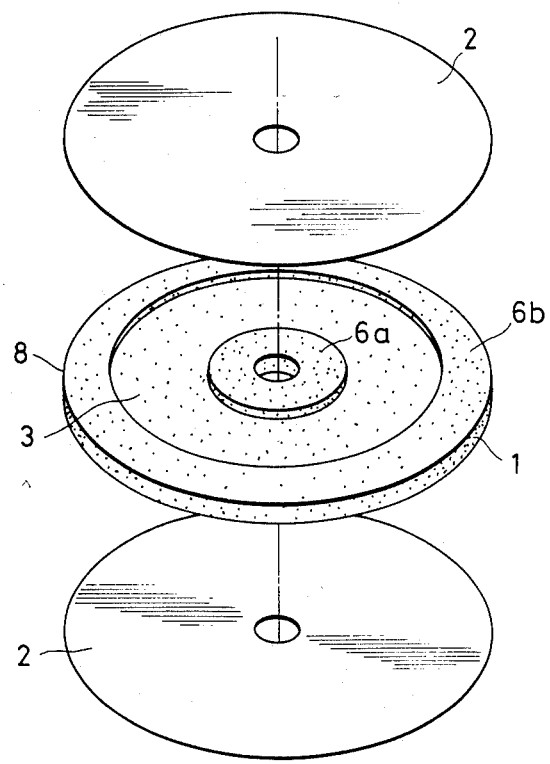
FIG. 2 is an exploded view of one example of a magnetic disk according to this invention.

FIG. 2 is an exploded view of one example of a magnetic disk according to this invention. A foamed material including continuous bubbles was foamed by using a mixture of acrylonitrile styrene-butadiene (ABS) and 10% glass fibers. The foamed material thus formed was used to manufacture a substrate 1 having the following properties:

Outside diameter: 130 mm
Inside diameter: 40 mm
Bonding inner and outer peripheral ridge width: 2 mm
Substrate thickness: 2 mm
Groove depth: 0.25 mm.

Flexible disk sheets 2 having an iron oxide magnetic layer 5 were bonded to the inner and outer peripheral ridges 6a and 6b which had been coated with thermosetting epoxy adhesive. As a result, air gaps were formed in the grooves 3.

Figure 1:
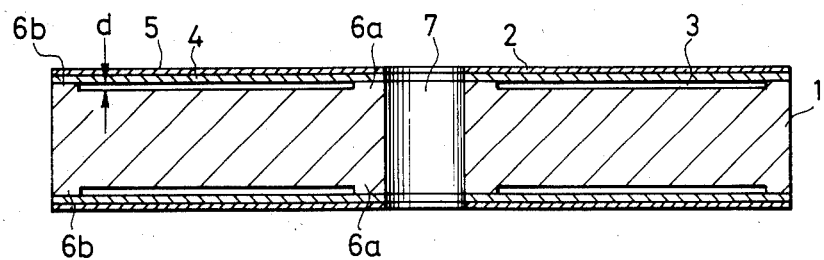
FIG. 1 is a sectional view showing the fundamental structure of a magnetic disk to which the technical concept of the invention is applied.

Otherwise, the disk of FIG. 2 is similar to the disk of FIG. 1.

With the magnetic disk, the head spacing loss was not detected with an ambient temperature change of 15° C. to 60° C.

As was described above, the grooves in the substrate are communicated through the small holes to the exterior or continuous bubbles are formed in the substrate. Therefore, even when the ambient temperature increases, the flexible disk sheets do not bend, and accordingly the head spacing loss is maintained unchanged.

As was described above, the magnetic disk of the invention employs the porous substrate having a number of fine holes through which the grooves are communicated with the outside. Therefore, even if the ambient or operating temperature changes, no pressure difference is formed between the grooves and the outside of the magnetic disk. Accordingly, under all operating conditions, the change of relative position of the magnetic head with the recording surface of the flexible disk sheet is eliminated. Thus, the magnetic disk of the invention has stable characteristics.

What is claimed is:

1. A recording disk, comprising;
a porous substrate having on at least one of two principal surfaces a raised inner annular surface and a raised outer annular surface, said surfaces defining a groove therebetween; and
a flexible recording sheet bonded to said inner and outer annular surfaces to enclose a gas in said groove beneath said sheet.

2. A disk as recited in claim 1, wherein said porous substrate comprises a porous material.

3. A recording disk, comprising;
a porous substrate having on each of two principal surfaces a raised inner annular surface and a raised outer annular surface, said surfaces defining a groove therebetween on each of said principal surfaces; and
two flexible recording sheets bonded to said inner and outer annular surfaces on respective principal surfaces of said substrate to enclose a gas in a respective one of said grooves beneath a respective one of said sheets.

4. A disk as recited in claim 3, wherein said porous substrate comprises a porous material.

5. A disk as recited in claim 4, wherein said porous material comprises a foamed material.

6. A disk as recited in claim 4, wherein said porous material comprises foamed acrylonitrile styrenebutadiene and glass fibers.

7. A disk as recited in claim 4, wherein said porous material comprises polystyrene.

8. A recording disc, comprising:
a porous substrate having on at least one of two principal surfaces a raised inner annular surface and a raised outer annular surface, said surfaces defining a groove therebetween; and
a flexible recording sheet bonded to said inner and outer annular surfaces to enclose said groove;
wherein said porous substrate having pores allowing an exchange of gas between said groove and an outer atmosphere which is exterior to said groove, such that said groove and said outer atmosphere can become equalized in terms of atmospheric pressure.

9. A recording disc, comprising:
a porous substrate having on each of two principal surfaces a raised inner annular surface and a raised outer annular surface, said surfaces defining a groove therebetween on each said principal surfaces; and
a flexible recording sheet bonded to each said inner and outer annular surfaces on each respective principal surface of said substrate to enclose said groove;
wherein said porous substrate having pores allowing an exchange of gas between each said groove and an outer atmosphere which is exterior to said groove, such that said groove and said outer atmosphere can become equalized in terms of atmospheric pressure.

* * * * *